United States Patent Office 3,282,012
Patented Nov. 1, 1966

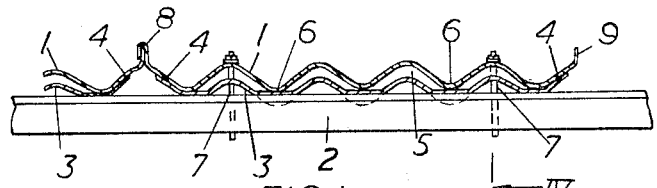
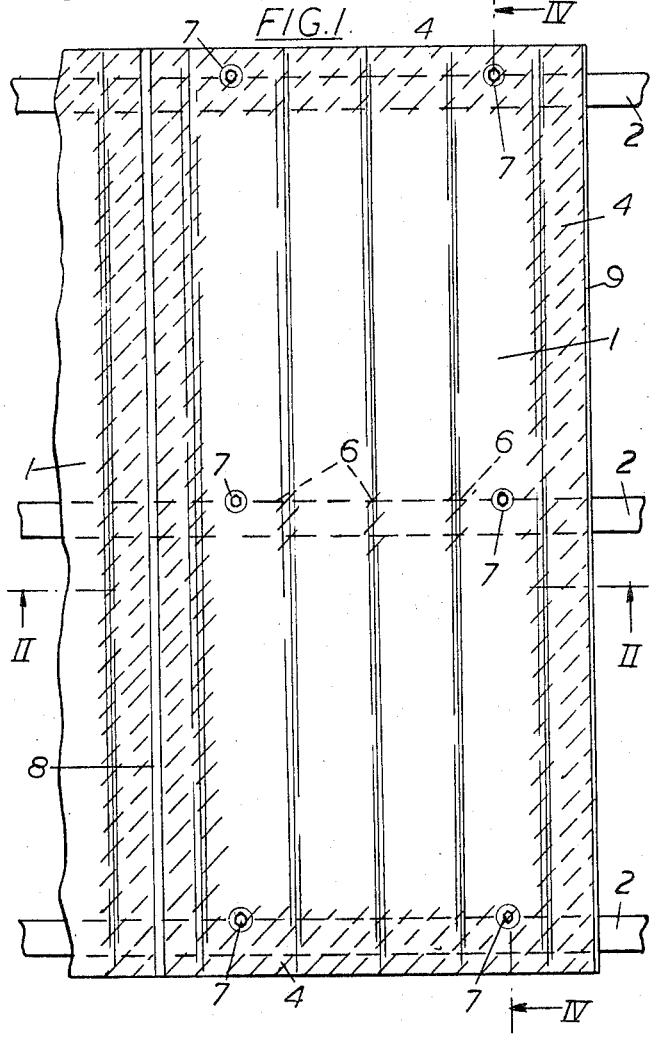
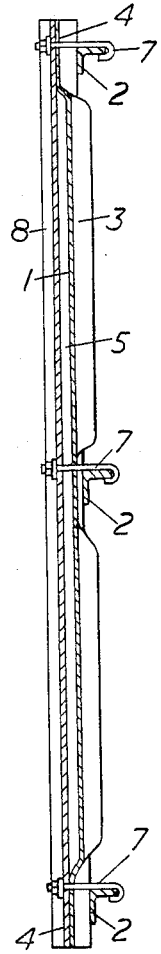
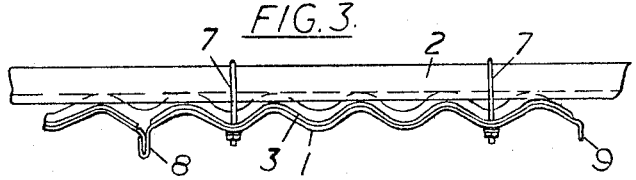

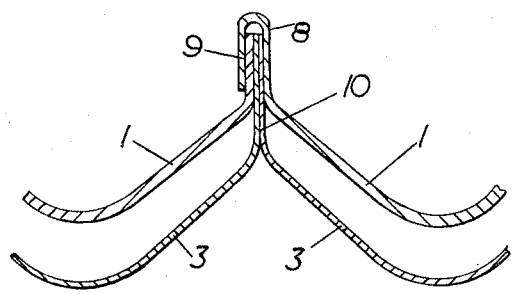
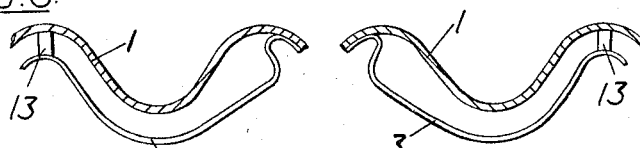
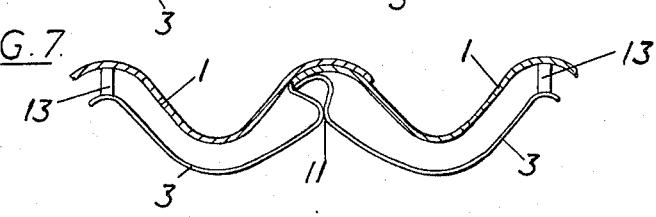
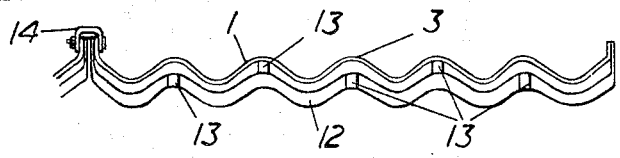
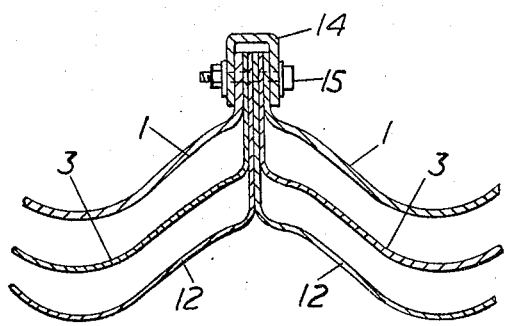

3,282,012
CORRUGATED MULTILAYER ROOFING
ELEMENTS
Roger Viguier Du Pradal, "Hillbrook," Castleknock,
Dublin County, Ireland
Filed Oct. 8, 1963, Ser. No. 314,684
Claims priority, application Ireland, Oct. 8, 1962,
842/62; Sept. 30, 1963, 950/63
7 Claims. (Cl. 52—618)

This invention concerns corrugated sheet elements used for roofing, advantageously employing plastic material.

The object of the invention is to provide improved roofing elements of the character referred to whereby not only may the transparent or translucent properties of plastic material be availed of to admit light through the roof, but a substantial measure of heat insulation may also be obtained without unduly complicating the manufacture of the elements or their application for use in covering a roof.

Accordingly, the invention provides a roofing element comprising two sheets or more of corrugated material placed one upon the other and sealed together along their margins, but otherwise spaced apart except for limited intermediate areas of contact. Advantageously the corrugations of the sheets run in the same longitudinal direction, and the sheets are spaced apart except where they are sealed together at their margins and are in contact over an intermediate area or areas running transversely across the element and spaced from the ends thereof, conveniently midway between the ends of the element. Preferably the sheets are sealed together, not only at their peripheral edges, but also at the intermediate area or areas where they are in contact.

A roofing element according to the invention is hereinafter described with reference to the accompanying drawing, wherein FIG. 1 is an elevation,
FIG. 2 is a cross-section on line II—II of FIG. 1,
FIG. 3 is a plan,
FIG. 4 is a section on line IV—IV of FIG. 1,
FIG. 5 is an enlarged detail showing an alternative shape which the improved roofing elements may take at their longitudinal marginal edges,
FIGS. 6 and 7 show a further modified shape which the longitudinal marginal portions of the elements may take respectively before and after two elements are assembled together.
FIG. 8 shows a modified form of a roofing element made with three corrugated sheets superimposed one upon another, and
FIG. 9 is an enlarged view of a detail of the joint between adjacent elements of the form shown in FIG. 8.

FIG. 1 is referred to as an "elevation" because it represents a view taken normally with respect to the plane of the roofing element. As thus viewed the element appears to consist merely of a rectangular corrugated sheet 1 of plastic material, advantageously transparent or translucent which is secured in customary manner to the underlying roof purlins 2 of the roof which is to be sheeted. It is generally convenient and advantageous for each roofing element to span three purlins which are spaced a predetermined distance apart, usually three feet or four feet, the sheet 1 being dimensioned accordingly. In the drawing the purlins are represented as bars of angle section, but they may obviously be of any desired form and material.

As is apparent from FIGS. 2, 3 and 4, however, the improved roofing element consists of the sheet 1 superimposed on a similarly corrugated sheet 3, the marginal portions 4 of which are shaped so as to lie in contact with the coincident portions of the sheet 1, but permitting the major portion of the two sheets to stand apart preferably one or two centimetres so as to leave an air space 5 therebetween. The sheets 1 and 3 are sealed together at the contacting marginal portions thereof and the occluded layer of air in the airspace 5 serves as an efficient insulator.

While the corrugations of the sheet 1, which is intended to be uppermost in the finished roof, are regular and straight longitudinally, the corrugations of the lower sheet 3, although they are similar in their pitch are not entirely straight, but are formed so that in addition to contacting over the transverse marginal portions 4 at each end of the sheets there are elevated areas 6 which afford isolated areas of contact between the two sheets 1 and 3 intermediately between said marginal portions. At the places where they touch, which are indicated by cross-hatching with broken lines in FIG. 1 the two sheets may be sealed together, either by welding under heat or by the use of an adhesive, depending on the nature of the plastic of which the sheets are made. If the areas of contact 6 are arranged in a line transversely of the roofing element at a place where it crosses a purlin in the finished roof, the element may be effectively secured to the purlin by bolts 7 or other fastening means passed through apertures provided in the sheets 1 and 3 for that purpose at said places of contact and hookedly engaging the underlying purlin 2. The element is similarly attached to the purlins underlying the marginal portion 4 at each end of the element, it being understood that the end portions of the element may overlap, or be overlapped by, the end portions of similarly corrugated roofing elements which are also secured by the bolts 7 as is usual in sheeting a roof with corrugated roofing elements, but not shown in the accompanying drawing in the interest of clarity.

The roofing elements may also overlap similar roofing elements at their lateral edges, but they lend themselves particularly well to the construction wherein the marginal extremity of the sheet 1 is bent up at right angles to the plane of the sheet at each side, and on one side is bent to a U-shape. Thus, the U-shaped rib 8 on one longitudinal edge of a sheet 1 receives between its limbs the upwardly projecting edge 9 of the next adjacent sheet 1. A joint is thus provided between the adjacent sheets which will exclude moisture and will not result in the formation of a broad substantially opaque band due to the accumulation of dirt between the two sheets, as would be liable to occur if the longitudinal marginal portions of the sheets simply overlap as is the present common practice with corrugated sheet roofing.

A roof sheeted with roofing elements constructed according to the invention will have particularly good heat insulating properties.

The heat insulation may be still further improved if desired, in the construction shown in FIGS. 1 to 4 by the insertion of a thin layer of heat insulating material, such as expanded polystyrene between the sheets 1 and 3 at the margins 4 and areas 6 where the two sheets come together. A layer of insulating material may be also be interposed between the sheet 3 and the purlins 2 upon which they are supported in the construction of a roof or the like.

The highly efficient insulating capability of the improved roofing elements may be maintained completely to the longitudinal meeting edges of adjacent sheets by forming the lower sheets 3 so that the marginal portions thereof lie in contact with each other at a point where they are not in direct contact with the upper sheets 1.

Such a construction is illustrated in FIG. 5, in which sheets 3 meet at 10 which is spaced from the place where they join the sheets 1 adjacent to the projecting edge 9 and rib 8 respectively.

Advantageously the lower sheet 3 is relatively thin and flexible compared with the upper sheet 1. It is not essential that the meeting edge portions of the adjacent sheets 1 should be bent up at right angles to the plane of the sheets. FIG. 6 shows in cross section the longitudinal marginal portions of two adjacent elements of which the sheets 1 follow a uniform corrugated shape prior to overlapping. FIG. 7 shows the elements of FIG. 6 after they have been placed together with the edge portions overlapping. The edge of the sheet 1 of the lower element presses against the contiguous portion of the adjacent sheet 3 of the upper element, thereby flexing the sheet 3 and ensuring a weather-tight joint between the elements, while at the same time portions of the adjacent sheets 3 lie in contact at 11, thereby maintaining effective resistance to the transfer of heat from one side of the roofing elements to the other.

The heat insulating effect of the improved roofing element according to the invention may be further enhanced by superimposing, not merely two, but three corrugated roofing sheets one upon the other, with an insulating air space therebetween. Such a construction is illustrated in FIGS. 8 and 9. FIG. 8 shows a top corrugated sheet 1, intermediate sheet 3 and bottom corrugated sheet 12, secured together along their longitudinal marginal edges in a similar manner to that above described with reference to FIG. 5. The manner of joining the adjacent roofing elements is shown to an enlarged scale in FIG. 9. The longitudinal marginal portions of the sheets 1, 3 and 12 of each element are preferably secured together by an adhesive where they lie together in contact and the adjacent elements are also clamped together by the aid of a U-shaped cover strip 14 through which bolts 15 are passed at suitable intervals, or in any other convenient manner. Small distance pieces or spacers of insulation material such as expanded polystyrene, may be interposed at selected points between the superimposed sheets in the modified forms of the invention as depicted by the bosses 13 in FIGURES 6, 7 and 8.

While it is generally preferred to construct the improved rofing elements entirely of plastic materials, the invention may also be carried out wholly or partly with sheets of metal, asbestos cement or other known roofing materials capable of being shaped as herein described.

The roofing elements according to the invention may be formed from relatively thin sheets, since the two superimposed sheets serve to reinforce each other and provide a relatively strong and rigid element, they can be used to roof a building just as easily as corrugated roof elements of normal construction, and when so used are of pleasing appearance, and if made of transparent plastic material offer little obstruction to the passage of light, depending of course upon the light transmitting qualities of the plastic employed. They afford effective insulation against loss of heat through the roof when the temperature outside the building is lower than the temperature inside, and prevent undue heating of the atmosphere within the building even when the surface of the roof is subjected to the direct heat of the sun, as well as reducing or eliminating the deposition of moisture by condensation upon the under surface of the roofing elements.

The expression "corrugated roofing element" used herein is intended to include roofing elements having an irregular configuration comparable with corrugations, for example, so as to simulate tiling. The roofing elements described above can also be applied to walls to provide a transparent or translucent heat insulating area wherever described.

I claim:

1. A rectangular corrugated roofing element comprising an upper sheet having regular corrugations which are straight superimposed upon a lower sheet having corrugations which conform to and coincide with those of the upper corrugated sheet around all four edges of the sheets but certain of which are not straight longitudinally so that the sheets are spaced apart intermediately, said edges being sealed together.

2. A rectangular corrugated roofing element comprising an upper sheet having regular corrugations which are straight superimposed upon a lower sheet having corrugations which conform to and coincide with those of the upper corrugated sheet around all four edges of the sheets but certain of which are not straight longitudinally so that the sheets are spaced apart intermediately while leaving isolated areas of contact, said edges being sealed together.

3. A rectangular corrugated roofing element comprising an upper sheet having regular corrugations which are straight superimposed upon a lower sheet having corrugations which conform to and coincide with those of the upper corrugated sheet around all four edges of the sheets but certain of which are not straight longitudinally so that the sheets are spaced apart intermediately, said edges being sealed together and the longitudinal edges of both sheets being turned up perpendicularly to the general plane of the element.

4. A rectangular corrugated roofing element comprising an upper sheet having regular corrugations which are straight superimposed upon a lower sheet having corrugations which conform to and coincide with those of the upper corrugated sheet around all four edges of the sheets but certain of which are not straight longitudinally so that the sheets are spaced apart intermediately, said edges being sealed together and the longitudinal edges of both sheets being turned up perpendicularly to the general plane of the element and one of said longitudinal edges on one sheet being of U-shaped cross section while the longitudinal edges of the remaining sheet are flat.

5. A rectangular corrugated roofing element comprising an upper sheet having regular corrugations which are straight superimposed upon a lower sheet having corrugations which conform to and coincide with those of the upper corrugated sheet around all four edges of the sheets but certain of which are not straight longitudinally so that the sheets are spaced apart intermediately while leaving isolated areas of contact, said edges being sealed together, and the longitudinal edges of both sheets being turned up perpendicularly to the general plane of the element.

6. A rectangular corrugated roofing element comprising an upper sheet having regular corrugations which are straight superimposed upon a lower sheet having corrugations which conform to and coincide with those of the upper corrugated sheet around all four edges of the sheets but certain of which are not straight longitudinally so that the sheets are spaced apart intermediately while leaving isolated areas of contact, said edges being sealed together, and the longitudinal edges of both sheets being turned up perpendicularly to the general plane of the element, and one of said longitudinal edges on one sheet being of U-shaped cross section while the longitudinal edges of the remaining sheet are flat.

7. A rectangular corrugated roofing element comprising an upper sheet having corrugations which are straight superimposed upon a lower sheet having corrugations which conform to and coincide with those of the upper corrugated sheet around all four edges of the sheets but certain of which are not straight longitudinally so that the sheets are spaced apart intermediately, said edges being sealed together and the longitudinal edges of both sheets being turned up perpendicularly to the general plane of the element, portions of one of the sheets which lie adjacent to the turned-up edges thereof being each disposed in the same plane as said adjacent turned-up edge but out of contact with the other sheet.

(References on following page)

References Cited by the Examiner

UNITED STATES PATENTS

| | | | |
|---|---|---|---|
| 612,024 | 10/1898 | Drake | 52—22 |
| 858,287 | 6/1907 | Higginbotham | 52—618 |
| 1,277,622 | 9/1918 | Madison | 52—408 |
| 1,672,629 | 6/1928 | Stuckert | 52—11 |
| 1,987,798 | 1/1935 | Ruppricht | 52—408 X |
| 2,052,984 | 9/1936 | Madison | 52—453 |
| 2,071,454 | 2/1937 | Coddington | 52—347 |
| 2,302,949 | 11/1942 | Palmer | 52—588 |
| 2,417,899 | 3/1947 | Ashman | 52—521 |
| 2,436,543 | 2/1948 | Blaski | 52—521 |
| 2,526,323 | 10/1950 | Blaski | 52—630 |
| 2,981,361 | 4/1961 | Schofield | 52—144 |
| 3,111,786 | 11/1963 | Wasserman | 52—22 |
| 3,113,434 | 12/1963 | Phillips et al. | 52—11 |

FOREIGN PATENTS 1,275,684   10/1961   France.

OTHER REFERENCES

American Machinist, May 19, 1958, page 147.

FRANK L. ABBOTT, *Primary Examiner.*

JACOB L. NACKENOFF, *Examiner.*

M. O. WARNECKE, *Assistant Examiner.*